United States Patent [19]

Long, Jr. et al.

[11] Patent Number: 5,721,012
[45] Date of Patent: Feb. 24, 1998

[54] METHOD FOR CONTINUOUSLY COATING PARTICULATE MATERIAL

[75] Inventors: Richard L. Long, Jr.; Donald E. Barber, both of Ames, Iowa

[73] Assignee: Coating Machinery Systems, Inc., Ames, Iowa

[21] Appl. No.: 502,959

[22] Filed: Jul. 17, 1995

Related U.S. Application Data

[62] Division of Ser. No. 123,337, Sep. 17, 1993, Pat. No. 5,443,637.

[51] Int. Cl.$^6$ .................. B05D 7/02; B05D 1/02; B05B 17/00
[52] U.S. Cl. .................. 427/212; 427/215; 427/242; 427/421; 118/20; 118/303; 118/50; 118/64; 118/418
[58] Field of Search .................. 427/421, 212, 427/215, 242; 118/19, 20, 303, 50, 64, 417, 418

[56] References Cited

U.S. PATENT DOCUMENTS

| | | |
|---|---|---|
| 39,722 | 9/1863 | Dole . |
| 1,391,604 | 9/1921 | Baumgard . |
| 3,729,834 | 5/1973 | Fox . |
| 3,883,959 | 5/1975 | Neville . |
| 4,027,624 | 6/1977 | Motoyama . |
| 4,272,234 | 6/1981 | Tse . |
| 4,308,669 | 1/1982 | Noyes et al. . |
| 4,543,906 | 10/1985 | Glatt et al. . |
| 4,586,457 | 5/1986 | Dunajtschik . |
| 4,639,383 | 1/1987 | Casey ............ 118/303 |
| 4,640,218 | 2/1987 | Motoyama et al. . |
| 4,686,115 | 8/1987 | Majer . |
| 4,862,826 | 9/1989 | Christen ............ 118/303 |

*Primary Examiner*—Michael Lusignan
*Assistant Examiner*—Bret Chen
*Attorney, Agent, or Firm*—Zarley, McKee, Thomte, Voorhees, & Sease

[57] ABSTRACT

An apparatus is provided for continuously coating particulate material, such as seeds. The apparatus includes a frame, a cylindrical drum rotatable about an axis tilted with respect to a horizontal plane, and a series of spray nozzles extending into the drum so as to spray one or more coating solutions onto the particulate material which tumbles within the rotating drum. The drum includes a rifling with flighting which carries the material upwardly from approximately 6 o'clock position to a 9 o'clock position, wherein the material falls from the flighting in a curtain spaced apart from the sidewall of the drum. Perforations in the sidewall of the drum allow a flow of air through the drum and curtain of material so as to dry the coating solution on the material substantially instantaneously as the material is coated with solution in the drum. The drum is maintained at a negative pressure during the coating process. In an alternative embodiment, a second drum is provided in series with the first drum, with a conduit interconnecting the drums such that material can be coated in the first drum and then conveyed to the second drum for additional coating.

18 Claims, 3 Drawing Sheets

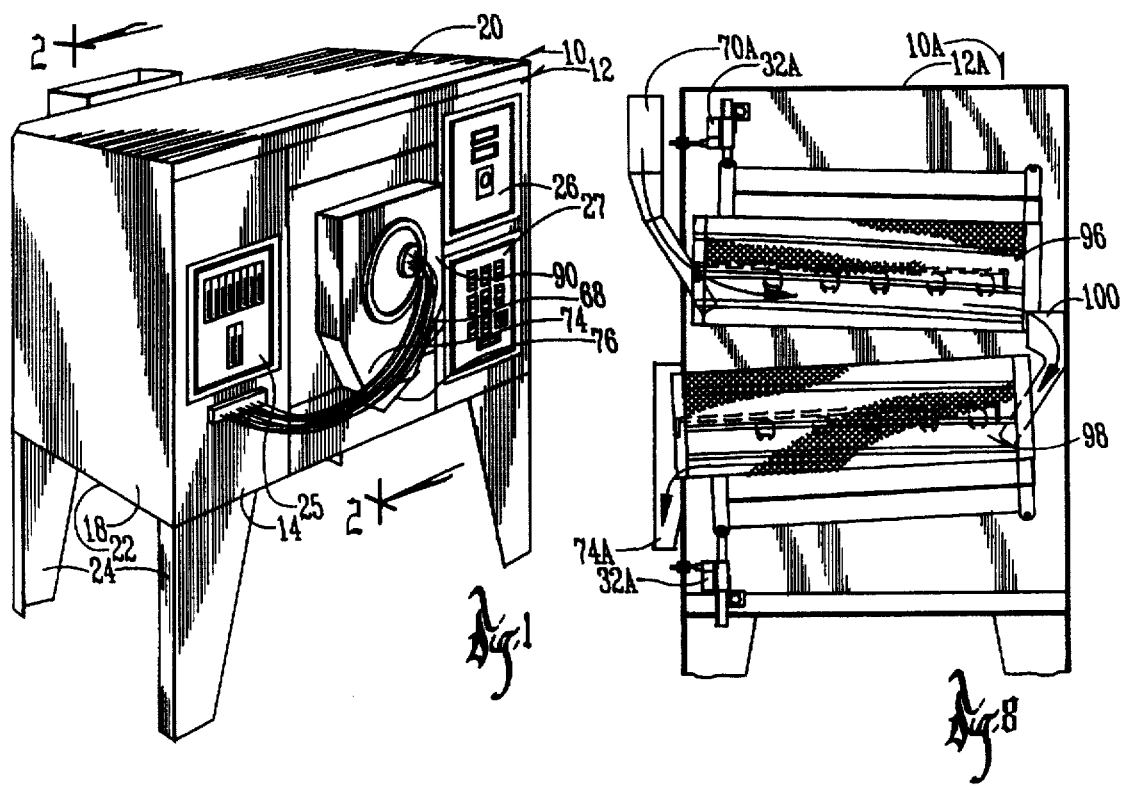
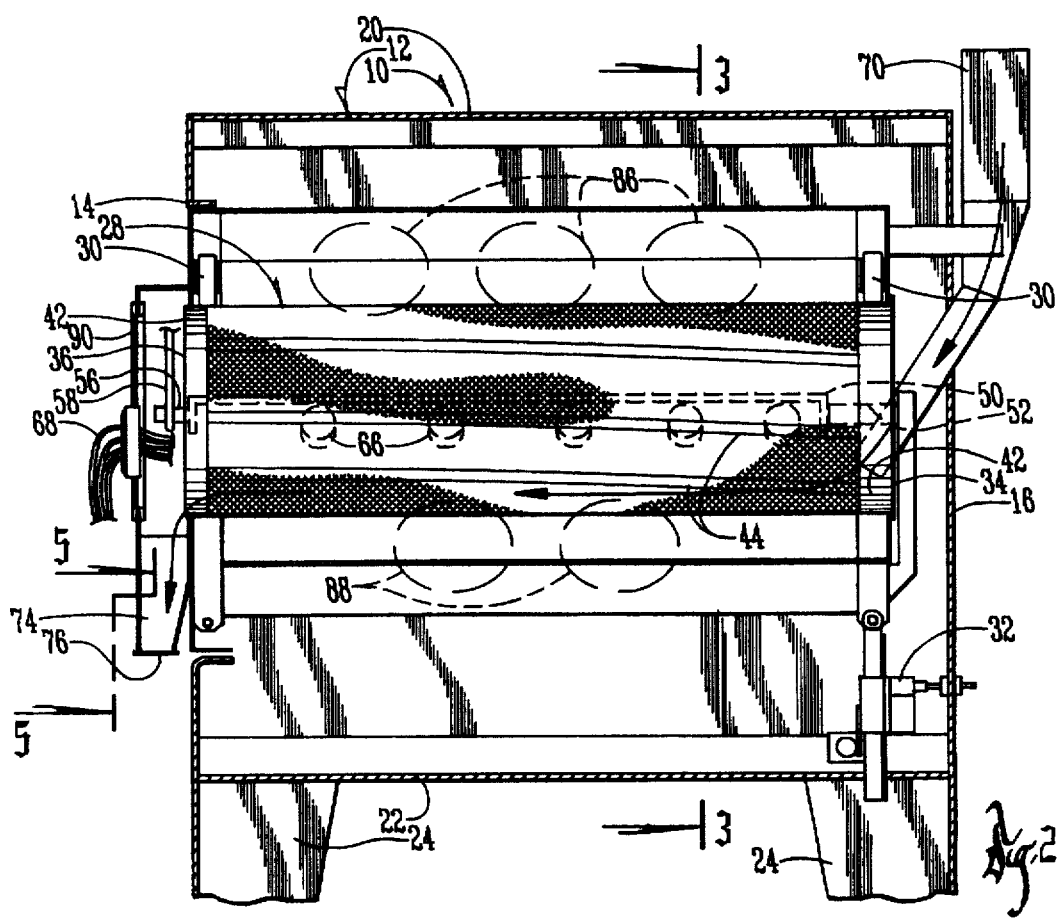

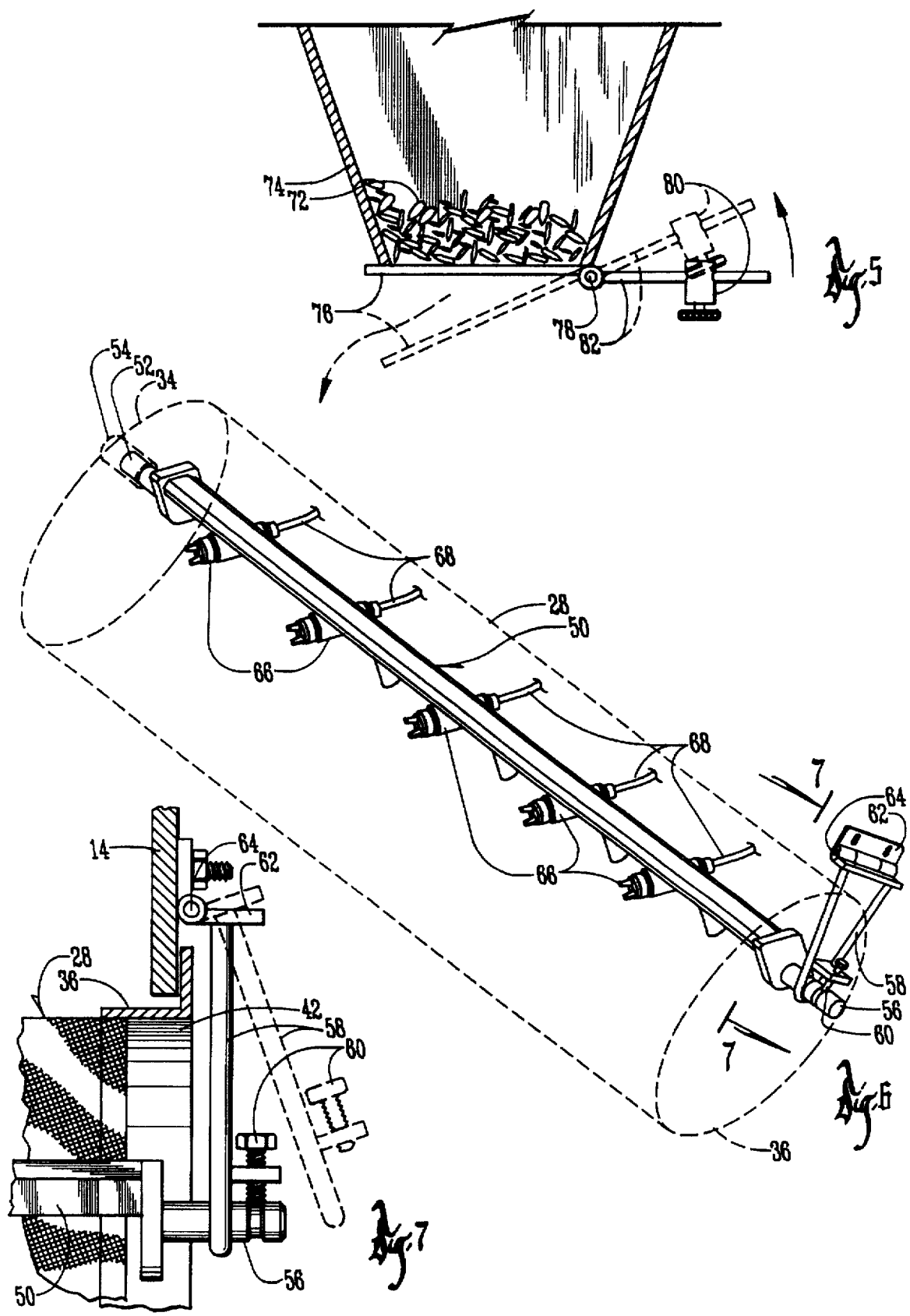

METHOD FOR CONTINUOUSLY COATING PARTICULATE MATERIAL

This is a divisional of copending application(s) Ser. No. 08/123,337 filed on Sep. 17, 1993 now U.S. Pat. No. 5,443,637.

BACKGROUND OF THE INVENTION

It has been known for many years to coat small particles, such as seeds and pharmaceutical products. Generally, a coating which increases the weight of the seed up to 25% is defined as a film coating. A coating which increases the weight of the seed more than 25% is referred to as pelletizing. Pelletizing provides uniformity of size to the particles. Depending on the extent of coating applied, pelletizing may provide a spherical shape to the particles which are normally elongated or irregularly shaped.

There are three primary reasons for providing a coating to such particles. First, a protective coating is often applied to seeds so as to prevent dust-off of prior treatments that have been applied. For example, a film of biological material may be applied to the seed to increase the viability of the seed, and a protective coating is needed to prevent the film from being worn away from the seed during handling. The protective coating allows for a reduction in the amount of film treatment that needs to be applied, thus reducing costs to the seed company. The protective coating also increases the effectiveness of the film treatment by encapsulating the film on the seed. Also, the protective coating reduces environmental hazards of the film treatment.

Another purpose of providing a coating to seeds and small pharmaceutical products is to increase the size of the particle. Particularly for seeds which are too small to be mechanically planted, such an increase in size allows small seeds to be planted mechanically, rather than manually, thereby resulting in significant labor savings, both during the planting and by eliminating manual thinning. Mechanical planting also reduces the seed population required for planting, thereby providing further cost savings.

A third benefit provided by seed coatings is to increase the visibility of the seeds during planting. Therefore, more accurate and less wasteful planting results.

In prior art pelletizing operations, a binder material in a solution was applied by spray, and then a bulking agent, such as clay or wood fibers, was manually applied to the seeds. After the two-step binding and bulking operations were completed, the coated seeds were then taken to an oven to bake dry. Thus, the prior art multiple-step process was slow, time consuming, and labor intensive.

Therefore, a primary objective of the present invention is the provision of an improved method and means for continuously coating particulate material, such as seeds.

Another objective of the present invention is the provision of a method and means for continuously coating seeds, wherein the coating solution is applied and dried in a rotating drum.

A further objective of the present invention is the provision of a method and means for coating seeds wherein multiple layers of different coatings can be applied to the seeds in a continuous process.

Still another objective of the present invention is the provision of a method and means for continuously coating seeds in a rotating drum having high air flow through the drum so as to maintain low drying temperatures.

A further objective of the present invention is the provision of a method and means or continuously pelletizing seeds wherein a binder and a bulking agent are applied simultaneously in a solution.

Yet another objective of the present invention is the provision of a continuous pelletizing machine having a tilted rotatable drum which is vented for substantially instantaneous drying of the seeds as the seeds are coated.

Still another objective of the present invention is the provision of a method and means for continuously coating particulate material wherein the flow rate of the material through a drum is selectively adjustable.

Yet another objective of the present invention is the provision of a method and means for coating particulate material in a rotating drum which is maintained at a negative pressure.

A further objective of the present invention is the provision of a means for continuously coating particulate material which is economical to manufacture, and efficient and durable in use.

These and other objectives will become apparent from the following description of the invention.

SUMMARY OF THE INVENTION

A method and means is provided for continuously coating particulate material, such as seeds. The apparatus includes a cylindrical drum having an axis of rotation tilted with respect to a horizontal plane, so as to have an upper inlet end and an lower outlet end. The drum is mounted on a frame within a housing, with the angle of tilt of the drum being adjustable. The drum is operatively connected to a motor for rotating the drum about the tilted axis. A spray bar having a plurality of spray nozzles mounted thereon extends longitudinally into the drum, and is removably mounted on the free. One or more coating solutions are sprayed from the nozzles so as to coat the particular material as the drum rotates. The drum has a plurality of flightings which carry the particulate material approximately from a 6 o'clock position to a 9 o'clock position as the drum rotates in a clockwise direction, and then tumbles the material in a curtain spaced apart from the sidewall of the drum. Heated air passes through the curtain of material, the space between the material and the drum, and the perforated sidewall of the drum so as to dry the coating solution onto the material substantially instantaneously.

In operation, as the material is coated, it increases in size and weight. Since the drum is tilted, the material flows by gravity downwardly through the drum for eventual discharge through the outlet end. As the material progresses through the drum, it is coated with solution from the successive spray nozzles. Electrical circuitry and a computer or micro-processor are provided for controlling the operation of the apparatus.

In an alternative embodiment, a second inclined rotatable drum is provided in the housing, along with its own series of spray nozzles and the heated air dryer system. A conduit interconnects the lower end of the first drum with the upper end of the second drum such that the particulate material is conveyed from the first drum to the second drum for additional coating therein.

BRIEF DESCRIPTION OF THE DRAWINGS

FIG. 1 is a perspective view of the continuous coating apparatus for particulate material according to the present invention.

FIG. 2 is a sectional view taken along lines 2—2 of FIG. 1.

FIG. 5 is an enlarged sectional view taken along lines 5—5 of FIG. 2 showing the discharge door at the outlet end of the drum.

FIG. 6 is a partial perspective view of the spray bar and nozzles of the present invention.

FIG. 7 is an enlarged sectional view taken along lines 7—7 of FIG. 6.

FIG. 8 is a side sectional view similar to FIG. 2 showing an alternative embodiment of the apparatus having two tilted rotatable drums in series.

DETAILED DESCRIPTION OF THE DRAWINGS

Figure 3:
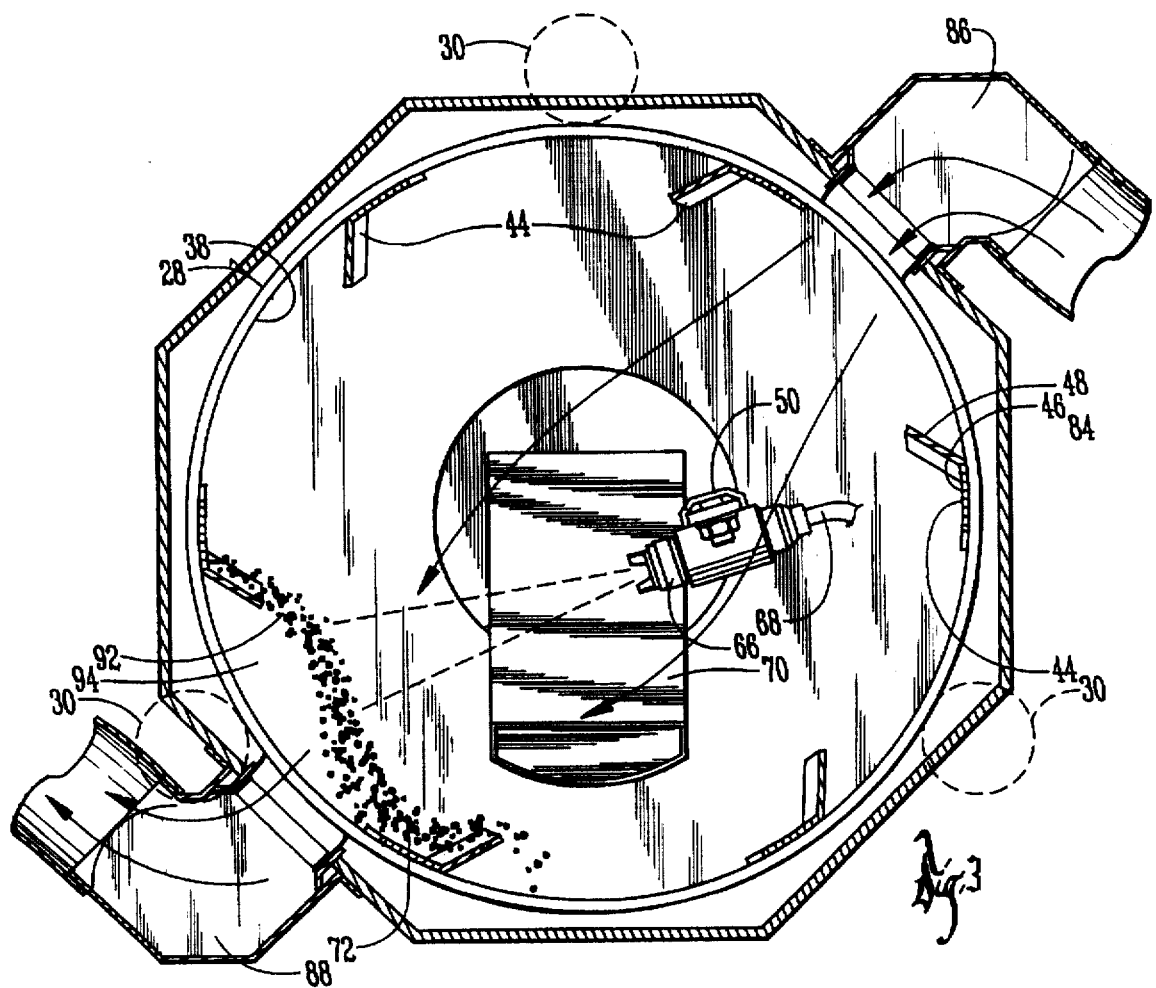
FIG. 3 is a sectional view taken along lines 3—3 of FIG. 2.

The particulate material coating apparatus of the present invention is generally designated in the drawings by the reference numeral 10. The apparatus includes a housing 12 defined by a front wall 14, a back wall 16, opposite side walls 18, a top wall 20, and a bottom wall 22. Legs 24 support the apparatus 10 on a floor or other support surface. Instrument panels 25, 26 and 27 are mounted on the front wall 16, and are operatively connected to electrical circuitry and a computer or a micro-processor for controlling the operation of the apparatus, as described below.

Mounted within the housing 12 is a cylindrical drum 28. The drum 28 is rotatably supported by a plurality of trunnion wheels 30 for rotation about its axis. At least one of the trunion wheels 30 is a drive wheel operatively connected to a motor (not shown) for rotating the drum 28. The axis of the drum is inclined relative to a horizontal plane, preferably between ½°–6°. The tilt of the drum can be adjusted by a jack 32 mounted within the housing 12. The drum has an upper inlet end 34 and a lower outlet end 36.

Figure 4:
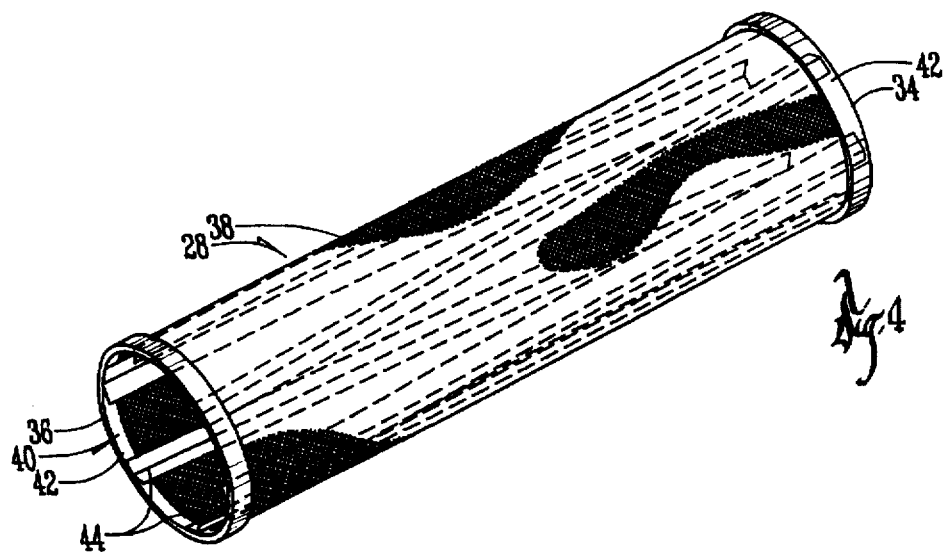
FIG. 4 is a perspective view of the drum used in the apparatus of the present invention.

As best seen in FIGS. 2–4, the drum 28 includes a perforated sidewall 38, which is preferably made from a mesh screen. A rifling 40 is removably inserted within the screen. The rifling 40 includes a ring 42 at each end and a plurality of flightings 44 extending between the end rings 42. Each flighting includes a first flange 46 extending along the sidewall 38 and a second flange 48 angularly disposed with respect to the first flange 46. Preferably, the angle between the flanges 46, 48 is approximately 130°±20°. Also, the flightings 44 are not axially aligned between the end rings 44, but rather are pitched slightly from one end to the other. Preferably, the flightings 44 will be offset ½ inch in a four foot long drum. This offset of the flightings is best shown in FIGS. 2 and 4.

As best seen in FIG. 6, a spray bar 50 extends longitudinally within the drum 28. The bar 50 is removably mounted within the drum. More particularly, the first end 52 of the bar 50 is received on a stub shaft 54 extending from the housing 12 adjacent to the upper end 34 of the drum 28. The second end 56 of the bar 50 extends out of the lower end 36 of the drum 28, and is supported by a bracket 58. The bracket 58 is secured to the second end 56 of the bar 50 by a set screw 60. The bracket 58 is pivotially mounted to the front wall 14 of the housing 12 by a hinge 62. Thus, when the set screw 60 is loosened, the bracket 58 can be pivoted about the hinge axis 64, as shown in dotted lines in FIG. 7, so as to remove the bracket from supporting engagement of the second end 56 of the spray bar 50. Thus, the spray bar 50 can be longitudinally removed from the drum 28.

The spray bar 50 has a plurality of nozzles 66 mounted thereon. Each of the nozzles is operatively connected to a hose or line 68 through which a coating solution flows for emission from the nozzles. Preferably, the coating solution includes a bulking agent and a binder. The hoses 68 may carry the same or different coating solutions.

The apparatus 10 includes an inlet hopper 70 for introducing particulate material 72 into the upper inlet end 34 of the drum 28. The apparatus 10 also includes a discharge chute 74 adjacent the lower outlet end 36 of the drum 28. A door 76 is pivotially mounted on the discharge chute 74. The door 76 is movable between a normally closed position, shown in solid lines in FIG. 5, and an open position, shown in broken lines in FIG. 5. The door 76 is pivotal about an axis 78. The door 76 includes an extension member 80 having a weight 82, such that the door is counter-balanced and biased to the closed position. When a sufficient quantity of coated particulate material 72 engages the door 76, the weight of the material offsets the counter-balance weight 82 such that the door pivots to the open position, thereby allowing the coated particulate material 72 to be discharged from the chute 74.

The apparatus 10 includes a drying system for drying the material in the drum 28, as the material is coated with the coating solution. More particularly, as best seen in FIG. 3, the drying system includes a stationary shroud 84 which extends around the drum 28. An air inlet plenum 86 is operatively connected to a source of air, including a blower (not shown) and a heater (not shown), and extends through a portion of the shroud 84 for introducing heated air into the drum 28 through the perforated sidewall 38. An air outlet plenum 88 extends through a different portion of the shroud 84, opposite the inlet plenum 86, and is operatively connected to a blower (not shown) for exhausting air from the drum 28. A door 90 is pivotially mounted upon the front wall 14 of the housing 12 so as to enclose the lower end 36 of the drum 28 and the discharge chute 74. Thus, when the blowers for the inlet and outlet plenums 86, 88 are actuated, a negative pressure is maintained within the drum. The hoses 68 for the spray nozzles 66 extend through the front door 90, as seen in FIG. 2.

In operation, the particulate material 72 is introduced into the upper end 34 of the drum 28 through the inlet hopper 70. As the drum rotates, the material 72 flows by gravity longitudinally through the drum for coating by solution sprayed from the nozzles 66. The material may be coated with one or more solutions from the sequential nozzles. A negative pressure is maintained in the drum 28 during the coating process. The door 90 and the door 76 provide a seal at the outlet end of the drum, while the incoming particulate material substantially seals the inlet end of the drum. If desired a pivotal flap door similar to the door 76 may be provided on the inlet hopper 70 so as to enhance the seal at the inlet end of the drum.

The drum is rotated at approximately 15–35 rpm, depending on the desired flow rate of the particulate material. As the drum rotates, the flightings 44 on the rifling 40 carry the particulate material upwardly from approximately a 6 o'clock position to a 9 o'clock position, as illustrated in FIG. 3. At approximately the 9 o'clock position, the material falls off of the flange 48 of the flightings 44 so as to form a curtain 92 of material spaced apart from the sidewall 38 of the drum 28. The nozzles 66 are directed toward the curtain of material 92. Heated air from the inlet plenum 86 is drawn through the curtain 92 of material and the space 94 between the curtain and the sidewall 38 of the drum, and exhausted through the perforated sidewall of the drum via the outlet plenum 88. The heated air substantially instantaneously dries the coating solution onto the particulate material.

Preferably, the temperature of the heated air is no more than 200°–220° F. The exhaust air is approximately 130°–140° F. The particulate material maintains a substantially constant temperature of 85°–90° F., thereby avoiding any deterioration or damage to the seed or to biological ingredients in the coating solution. As the material progresses along the length of the drum 28, the material is coated with successive layers of solution so as to increase in size and weight. As the material reaches the outlet end 36 of the drum 28, the material accumulates in the discharge chute 74 until a sufficient quantity of material pivots the door 76 to the open position for discharge of the coated material. The material is preferably in the drum for less than four minutes during the coating process.

Preferably, a computer or micro-processor is employed for controlling the operation of the apparatus 10. For example, the computer may be utilized for controlling the electrical power to the apparatus, the tilting angle and rotation of the drum 28, the spraying function of the nozzles 66, and the air flow and temperature in the drying system. The computer is operatively connected to the instrument panels 25, 26 and 27, which have the appropriate electrical circuitry, control buttons and indicator lights, so that a person can start and stop the various functions of the apparatus 10, and monitor its operation. The sequence of operational functions of the apparatus 10, as controlled by the computer program and electrical circuitry, is as follows:

A. Turn on Control Power

This function is for starting up the control center and activitating everything on the control panel allowing you to start to run the process.

1. Set Drum Angle

The drum angle is either an automatic or manual setting depending on which model is being used. Set the desired angle and proceed to do the pelletizing at that time. The angle can change depending on the product, on how big the seed is, the density, and amount going to be run.

2. Turn on the Solution Flow Pump

The flow pump can be running throughout the day at any time, however, if there is solution charged in the lines, it should be running at all times.

3. Turn on the Exhaust Blower

This is the first phase in a startup. Turn the exhaust blower on which the blower that creates the negative pressure on the side vented machine. Usually this blower is remote, however, you have instrumentation on the control panel to show that it is on.

4. Turn on the Inlet Blower

The inlet blower is the blower which moves the hot air from the header box to the usable source which is the inside of the drum.

5. Turn on the Air Heater

The systems can be either equipped with an indirect gas-fired or electric heater. At this time, once the inlet blower is turned on you would go ahead and turn on the air heater. There is an inter lock on our system to eliminate the possibility of turning the air heater on without the inlet blower running.

6. Set Temperature for Process

Different size seeds require different temperatures. We have designed in a temperature controller that either works on a 420 milliamp signal or the ON/OFF Solenoid type. We would set the process up to run at a specific inlet temperature. By spraying on the product we will maintain a product temperature.

7. Start Pan Drive (Coating Cylinder)

This is a button that activates the drum to start the motion of the seed or the coating cylinder to start the motion of the seed inside. This should be started and set at maximum speed which is 36 rpm. Again this depends on what size the seed is to determine the maximum speed setting.

8. Start Dust Collector

The dust collection system is used to collect over spray into a filter. By starting the Dust Collector causes a pulse air jet to start therefore cleaning the filter as you run the process.

9. Load Product to be Coated and Set Flow Rate

The reason you wait until now to load the product to be coated is because you want the heater to come up to temperature, but you don't necessarily want your seed to get that hot. So we load our product very last. Set your flow rate of seed through the system control panel.

10. Reach Temperature Set Point

By using the temperature controller you are able to take and set the control temperature at what you have determined to as your desired set point. You will then need to wait for the proper set point to show up on the digital readout. This means that the heater is now up to its running state and is ready to run.

11. Set Solution Pump Rate Again this is a digital read out function on the front of the machine. Typically when we're doing pelletizing we want to start out with a very low solution flow rate and then as the pellet gets larger we want to increase the spray rate. Start product through system using vibratory feeder at the pre-set speed set in step #9.

12. Turn on Spray

The machine is equipped with a pneumatic atomizing air gun. This function is done by using the control panel. This simply pulls the needle back and allows the solution to flow out of the nozzle, thus being sprayed. As product enter the drums it is sprayed, as it leaves, it is complete.

13. Spray Off

This is done after we have completed the pellet to the desired size. The simple function of pushing the OFF button and turning the spray off thus again puts the needle back up into the nozzle and discontinues the spraying.

14. Exhaust Off

Shut the exhaust blower off after the vacuuming is complete. Simply push the button off. Again since the exhaust blower is powerful it is remote mounted and the only instrumentation you have is on the control panel.

15. Turn On C.I.P. (Clean-in-Place)

There is a VeeJet nozzle that is mounted inside the machine and when turned on tap water of approximately 40–60 psi will spray fresh clean water throughout the system inside the drum and wash down the drum. This process should be done for about 15 minutes or depending on how dirty the pan is, may require more time. There is also a built in dram system underneath the machine that takes this dirty rinsate water and captures it into a bucket or drain, whichever you prefer. You may need to assist the CIP system by scrubbing some of the parts by hand while it is running.

16. Turn Off C.I.P

Simply turn off the button. This will eliminate water from being sprayed into the drum.

17. Turn On Inlet Blower

The inlet blower will allow you to dry the inside of the drum and does not hinder the filter on the exhaust sides. Under no condition should you run the exhaust filter or blower after CIP Session.

18. Turn On Heat to Dry Coating Cylinder

It doesn't take a lot of heat-approximately 90° F. It needs to run it until the pan is perfectly dry-about ten to fifteen minutes.

19. Turn Off Heat.

20. Turn Off Inlet Blower.

You have now completed an entire coating session using the horizontal fluidized coating system.

FIG. 8 shows an alternative embodiment 10A of the apparatus, wherein a pair of drums 96, 98 are mounted in the housing 12A. The drums 96, 98 are inclined in opposite directions. A conduit 100 interconnects the lower end of the first drum 96 and the upper end of the second drum 98 so that the particulate material can be conveyed from the first drum to the second drum. The apparatus 10A includes all of the features described above with respect to the apparatus 10, including trunion wheels for rotatably supporting the drums 96 and 98, jacks 32A for adjusting the tilt of the drums, an inlet hopper 70A, a discharge chute 74A, the spray nozzles for each drum, the drying system for each drum, and a rifling for each drum. The apparatus 10A functions similarly to the operation described above for the apparatus 10, with the exception that the particulate material is first coated in the first drum 96, and then conveyed by the conduit 100 to the second drum 98 for additional coating therein, before discharge through the discharge chute 74A. Additional drums can be added in series, if desired, for additional coating of the particulate material.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A method of continuously coating particulate material, comprising:

placing a quantity of particulate material in a first rotating perforated drum which has a cylindrical wall with an open inlet end and an open outlet end, and a rotating axis tilted slightly from a horizontal axis;

lifting the particulate material in the rotating drum from a lower position to a raised position and then depositing the particulate material in a downwardly extending curtain spaced from the cylindrical wall;

depositing a first coating solution on the downwardly extending curtain of particulate material; and directing a draft of air substantially linearly through the drum in a direction substantially perpendicular to the rotating axis so as to pass through the curtain of material and the space between the curtain and the drum to exit the drum through perforations in the drum adjacent the space, thereby drying the coating solution onto the particulate material.

2. The method of claim 1 further comprising maintaining a negative pressure in the drum as the particulate material is coated.

3. The method of claim 1 wherein the air has a temperature less than 220°.

4. The method of claim 1 further comprising tilting the drum at an angle between ½° to 6° with respect to a horizontal plane.

5. The method of claim 1 further comprising depositing a second coating material on the curtain of particulate material.

6. The method of claim 1 wherein the material is lifted by a plurality of flighting members extending along the drum.

7. The method of claim 1 wherein the coating solution is deposited onto the particulate material by spraying.

8. The method of claim 7 further comprising controlling the flow of coating solution being sprayed.

9. The method of claim 1 further comprising transferring the coated material from the first drum to a second rotating drum having a perforated cylindrical wall and an axis tilted with respect to a horizontal plane, lifting the particulate material in the second rotating drum to create a curtain of material spaced from the cylindrical wall, depositing a second coating of material on the curtain of particulate material, and drying the second coating with a substantially linear flow of air through the second drum.

10. A method of continuously pelletizing particulate material, comprising:

introducing the material into an open inlet end of a cylindrical drum having a side wall and an axis tilted with respect to a horizontal plane;

rotating the drum about the axis so as to tumble the material within the drum and such that the material migrates downwardly along the length of the drum;

lifting the migrating material with flightings extending along the side wall of the drum so as to produce a curtain of material spaced from the wall;

spraying at least one coating solution on the curtain of material so as to increase the size of the material;

drying the coated material in the drum with a substantially linear flow of air through the curtain of material; and removing the dried coated material from an open outlet end of the drum.

11. The method of claim 10 wherein the air is heated.

12. The method of claim 10 further comprising maintaining a negative pressure within the drum as the particulate material is coated with solution.

13. A method of continuously coating particulate material, comprising:

placing a quantity of particulate material in a first rotating perforated drum which has a cylindrical wall with an open inlet end and an open outlet end, and a rotating axis tilted slightly from a horizontal axis;

lifting the particulate material in the rotating drum and cascading the particulate material in a downwardly extending curtain spaced from the cylindrical wall;

depositing a first coating solution on the downwardly extending curtain of particulate material; and directing air through the curtain of material and the space between the curtain and the drum to exit the drum through perforations in the drum adjacent the space, thereby drying the coating solution onto the particulate material.

14. The method of claim 13 wherein the air is heated.

15. The method of claim 13 wherein the material is lifted by a plurality of flighting members extending along the drum.

16. The method of claim 13 wherein the coating solution is deposited onto the particulate material by spraying.

17. The method of claim 13 further comprising maintaining a negative pressure in the drum as the particulate material is coated.

18. The method of claim 13 further comprising tilting the drum at an angle with respect to a horizontal plane.

* * * * *